US012735274B2

(12) United States Patent
Mori et al.

(10) Patent No.: US 12,735,274 B2
(45) Date of Patent: Sep. 15, 2026

(54) CONTROL DEVICE, CONTROL METHOD, AND RECORDING MEDIUM

(71) Applicant: NEC Corporation, Tokyo (JP)

(72) Inventors: Youko Mori, Tokyo (JP); Tsutomu Maruyama, Tokyo (JP); Tadashi Natsukawa, Tokyo (JP); Masatsugu Ogawa, Tokyo (JP); Masumi Ichien, Tokyo (JP); Terumasa Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 18/485,812

(22) Filed: Oct. 12, 2023

(65) Prior Publication Data

US 2024/0140732 A1 May 2, 2024

(30) Foreign Application Priority Data

Oct. 27, 2022 (JP) ................................ 2022-172141

(51) Int. Cl.
*B65G 47/90* (2006.01)
*B25J 9/00* (2006.01)
*B25J 9/16* (2006.01)

(52) U.S. Cl.
CPC .......... *B65G 47/905* (2013.01); *B25J 9/0093* (2013.01); *B25J 9/1661* (2013.01); *B65G 2203/0241* (2013.01); *B65G 2203/041* (2013.01)

(58) Field of Classification Search
CPC .......... B65G 47/905; B65G 2203/0241; B65G 2203/041; B65G 1/1373; B25J 9/0093; B25J 9/1661; B25J 9/1697; G05B 2219/39102; G05B 19/4182; B65B 25/046; B65B 21/24; B65B 2220/16; B65B 5/08
See application file for complete search history.

(56) References Cited

U.S. PATENT DOCUMENTS

2013/0247519 A1* 9/2013 Clark ...................... B65B 57/00 53/452
2019/0077011 A1* 3/2019 Sezaki ................... B25J 9/1664
(Continued)

FOREIGN PATENT DOCUMENTS

DE 102014111632 A1 * 2/2016 ......... B65B 69/0033
JP 2016-175162 A 10/2016
(Continued)

OTHER PUBLICATIONS

Japanese Office Action for JP Application No. 2022-172141, mailed on Jun. 23, 2026 with English Translation.

*Primary Examiner* — Abby Lin
*Assistant Examiner* — Kayla R Doros
(74) *Attorney, Agent, or Firm* — Sughrue Mion, PLLC

(57) ABSTRACT

A control method by a computer, the control method acquires work information including information on work performed by a robot arm and information on an article as a target of the work; causes the robot arm to perform an operation of lifting up a predetermined unit of articles based on the work information; determines that there is a possibility that a plurality of articles are packaged together based on sensor data obtained when the operation is being performed; and when it is determined that there is a possibility that a plurality of articles are packaged together, settles a handling method for the article according to the sensor data.

9 Claims, 15 Drawing Sheets

(56) References Cited

U.S. PATENT DOCUMENTS

2019/0389082 A1* 12/2019 Higo ...................... G06N 3/045
2020/0122319 A1* 4/2020 Theobald ................. B25J 5/007
2020/0126025 A1* 4/2020 Kumar ................... G06Q 50/40
2020/0269429 A1* 8/2020 Chavez .................. B25J 9/1687
2020/0324973 A1* 10/2020 Edwards ................ G06Q 10/10
2021/0094187 A1* 4/2021 Kanemoto ............. B25J 13/085
2021/0198037 A1* 7/2021 Sabhnani ................. B65G 1/10
2022/0334560 A1* 10/2022 Lovett .................... B25J 9/1697
2022/0383246 A1* 12/2022 Singh ..................... G06Q 10/08

FOREIGN PATENT DOCUMENTS

JP 2021109257 A * 8/2021
JP 2021-154467 A 10/2021

* cited by examiner

Fig.5

| WORK TARGET ARTICLE NAME | WORK TARGET ARTICLE ID | NUMBER | MOVEMENT SOURCE | MOVEMENT DESTINATION |
| --- | --- | --- | --- | --- |
| | | | | |
| | | | | |
| | | | | |

Fig.6

| ARTICLE ID | ARTICLE NAME | SIZE | WEIGHT |
| --- | --- | --- | --- |
| | | | |
| | | | |
| | | | |

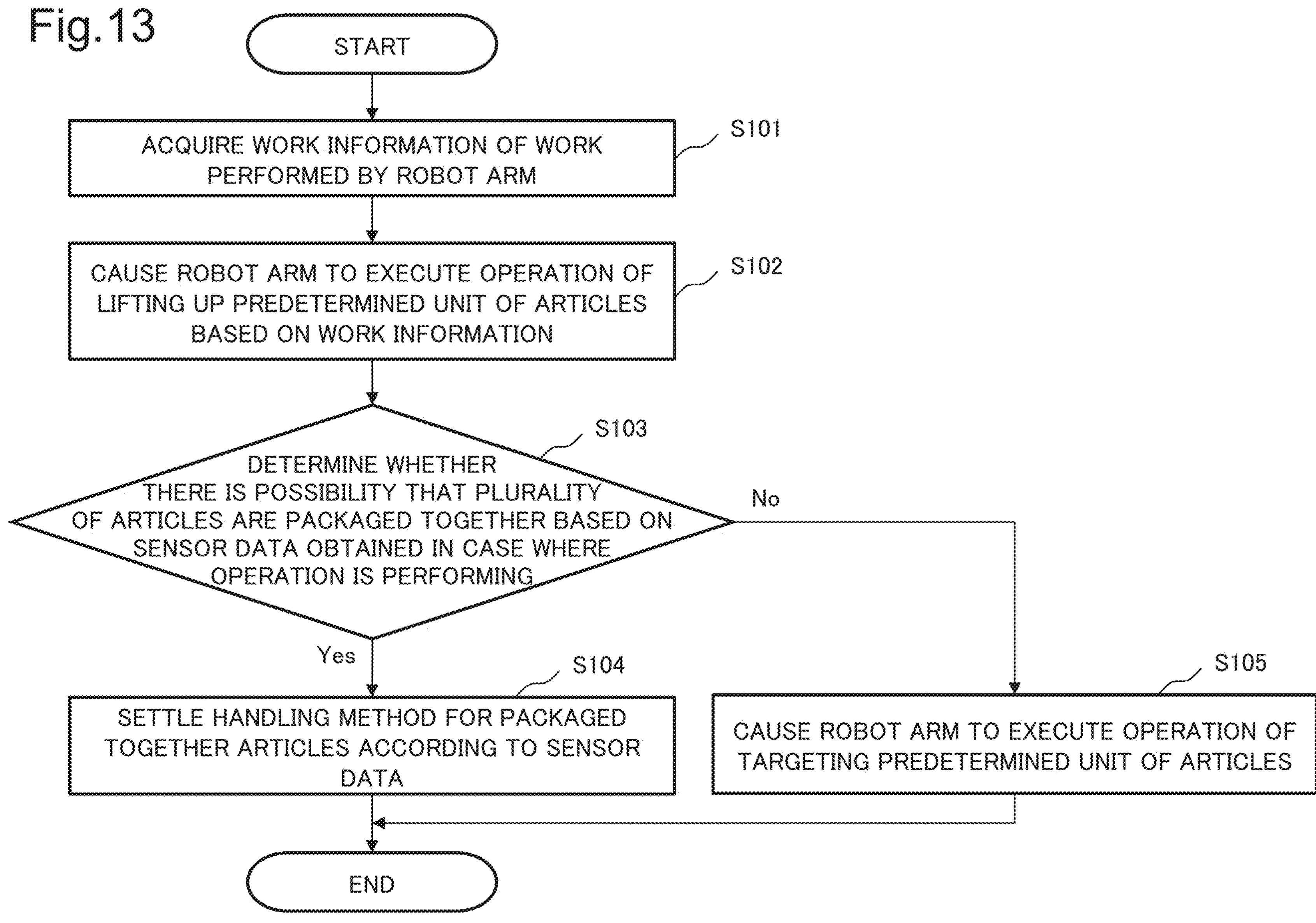
Fig.13
START
ACQUIRE WORK INFORMATION OF WORK PERFORMED BY ROBOT ARM
S101
CAUSE ROBOT ARM TO EXECUTE OPERATION OF LIFTING UP PREDETERMINED UNIT OF ARTICLES BASED ON WORK INFORMATION
S102
DETERMINE WHETHER THERE IS POSSIBILITY THAT PLURALITY OF ARTICLES ARE PACKAGED TOGETHER BASED ON SENSOR DATA OBTAINED IN CASE WHERE OPERATION IS PERFORMING
S103
No
Yes
SETTLE HANDLING METHOD FOR PACKAGED TOGETHER ARTICLES ACCORDING TO SENSOR DATA
S104
CAUSE ROBOT ARM TO EXECUTE OPERATION OF TARGETING PREDETERMINED UNIT OF ARTICLES
S105
END

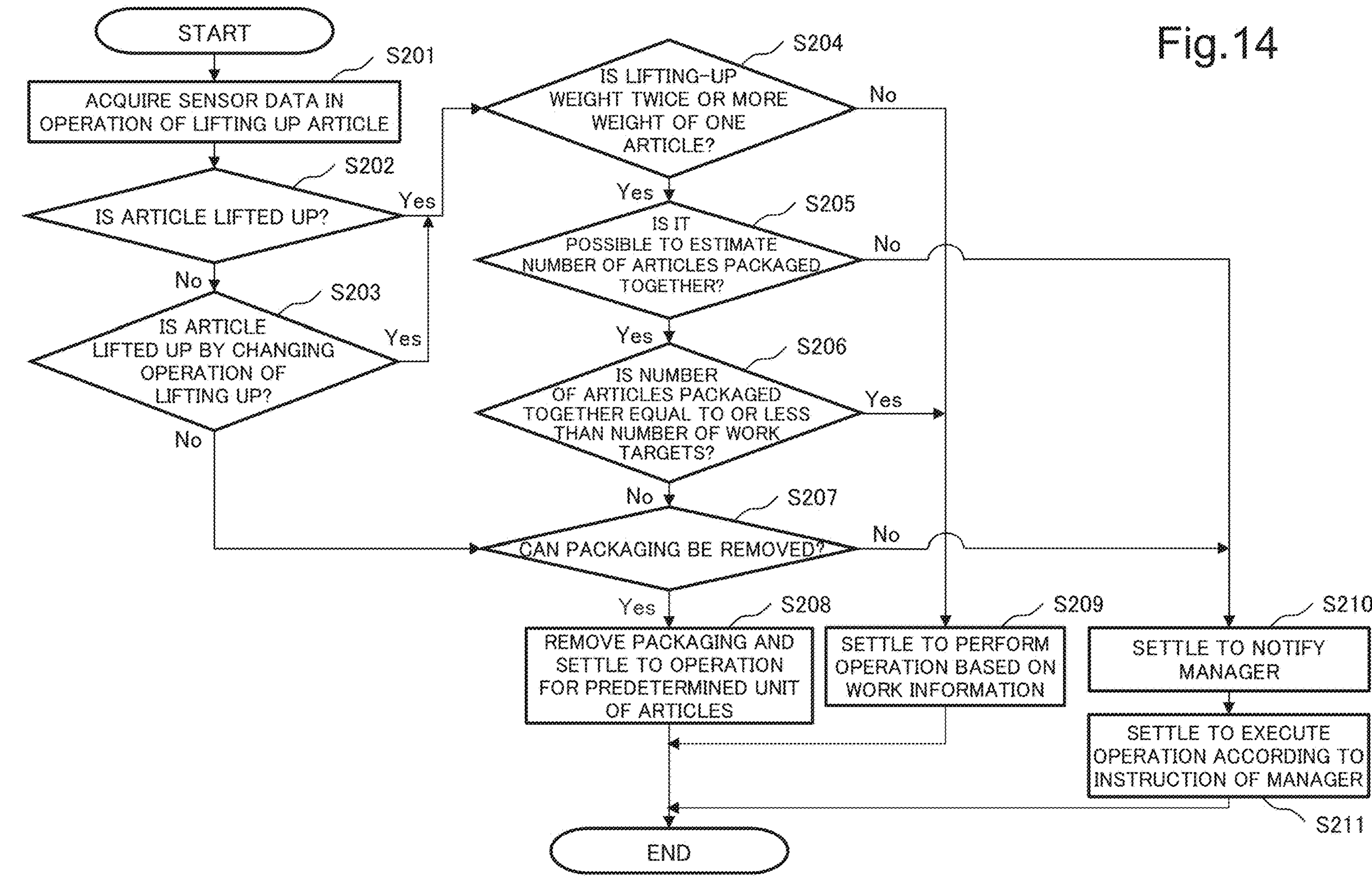
Fig.14
START
ACQUIRE SENSOR DATA IN OPERATION OF LIFTING UP ARTICLE
S201
IS ARTICLE LIFTED UP?
S202
Yes
No
IS ARTICLE LIFTED UP BY CHANGING OPERATION OF LIFTING UP?
S203
Yes
No
IS LIFTING-UP WEIGHT TWICE OR MORE WEIGHT OF ONE ARTICLE?
S204
Yes
No
IS IT POSSIBLE TO ESTIMATE NUMBER OF ARTICLES PACKAGED TOGETHER?
S205
Yes
No
IS NUMBER OF ARTICLES PACKAGED TOGETHER EQUAL TO OR LESS THAN NUMBER OF WORK TARGETS?
S206
Yes
No
CAN PACKAGING BE REMOVED?
S207
Yes
No
REMOVE PACKAGING AND SETTLE TO OPERATION FOR PREDETERMINED UNIT OF ARTICLES
S208
SETTLE TO PERFORM OPERATION BASED ON WORK INFORMATION
S209
SETTLE TO NOTIFY MANAGER
S210
SETTLE TO EXECUTE OPERATION ACCORDING TO INSTRUCTION OF MANAGER
S211
END

CONTROL DEVICE, CONTROL METHOD, AND RECORDING MEDIUM

This application is based upon and claims the benefit of priority from Japanese Patent Application No. 2022-172141, filed on Oct. 27, 2022, the disclosure of which is incorporated herein in its entirety by reference.

TECHNICAL FIELD

The present disclosure relates to a technique for controlling a robot arm, and the like.

BACKGROUND ART

Various types of robot arms are used in many applications. As an example, there is a technique of handling an article by a robot arm, such as movement and conveyance of the article.

For example, Japanese Patent Application Laid-Open No. 2021-109257 describes determining whether articles are packaged together with a sheet-like cover, and determining an appropriate gripping position when the articles are packaged together.

SUMMARY

A control device according to one aspect of the present disclosure includes: an acquisition means that acquires work information including information on work performed by a robot arm and information on an article as a target of the work; a control means that causes the robot arm to perform an operation of lifting up a predetermined unit of articles based on the work information; a determination means that determines that there is a possibility that a plurality of articles are packaged together based on sensor data obtained when the operation is being performed; and a settlement means that, when it is determined that there is a possibility that a plurality of articles are packaged together, settles a handling method for the article according to the sensor data.

A control method according to one aspect of the present disclosure includes: acquiring work information including information on work performed by a robot arm and information on an article as a target of the work; causing the robot arm to perform an operation of lifting up a predetermined unit of articles based on the work information; determining that there is a possibility that a plurality of articles are packaged together based on sensor data obtained when the operation is being performed; and when it is determined that there is a possibility that a plurality of articles are packaged together, settling a handling method for the article according to the sensor data.

A recording medium according to one aspect of the present disclosure that records a program for causing a computer to execute: acquiring work information including information on work performed by a robot arm and information on an article as a target of the work; causing the robot arm to perform an operation of lifting up a predetermined unit of articles based on the work information; determining that there is a possibility that a plurality of articles are packaged together based on sensor data obtained when the operation is being performed; and when it is determined that there is a possibility that a plurality of articles are packaged together, settling a handling method for the article according to the sensor data.

BRIEF DESCRIPTION OF THE DRAWINGS

FIG. 5 is a diagram illustrating an example of information on work;

FIG. 6 is a diagram illustrating an example of information of an article;

FIG. 13 is a flowchart illustrating an operation of the control device;

FIG. 14 is a flowchart illustrating an example of processing of the control device.

EXAMPLE EMBODIMENT

Next, an example embodiment of the present disclosure will be described in detail with reference to the drawings.

The present disclosure relates to control of a robot arm that handles an article. A control device according to the present disclosure controls a robot arm that handles an article. In the example embodiment of the present disclosure, the article is not particularly limited as long as the article can be handled by the robot arm. The article is, for example, an article packaged in a certain unit for distribution. As a more detailed example, the article is a drug packaged in a unit. The work of handling an article by a robot arm generally includes an operation of lifting the article. An example of work of handling an article by a robot arm is work of moving an article from one container to another container. In the following description, this work is referred to as container conversion. The work of handling articles by the robot arm is not limited to this example, and may be, for example, picking for collecting designated articles from among articles placed at various places.

Figure 1:
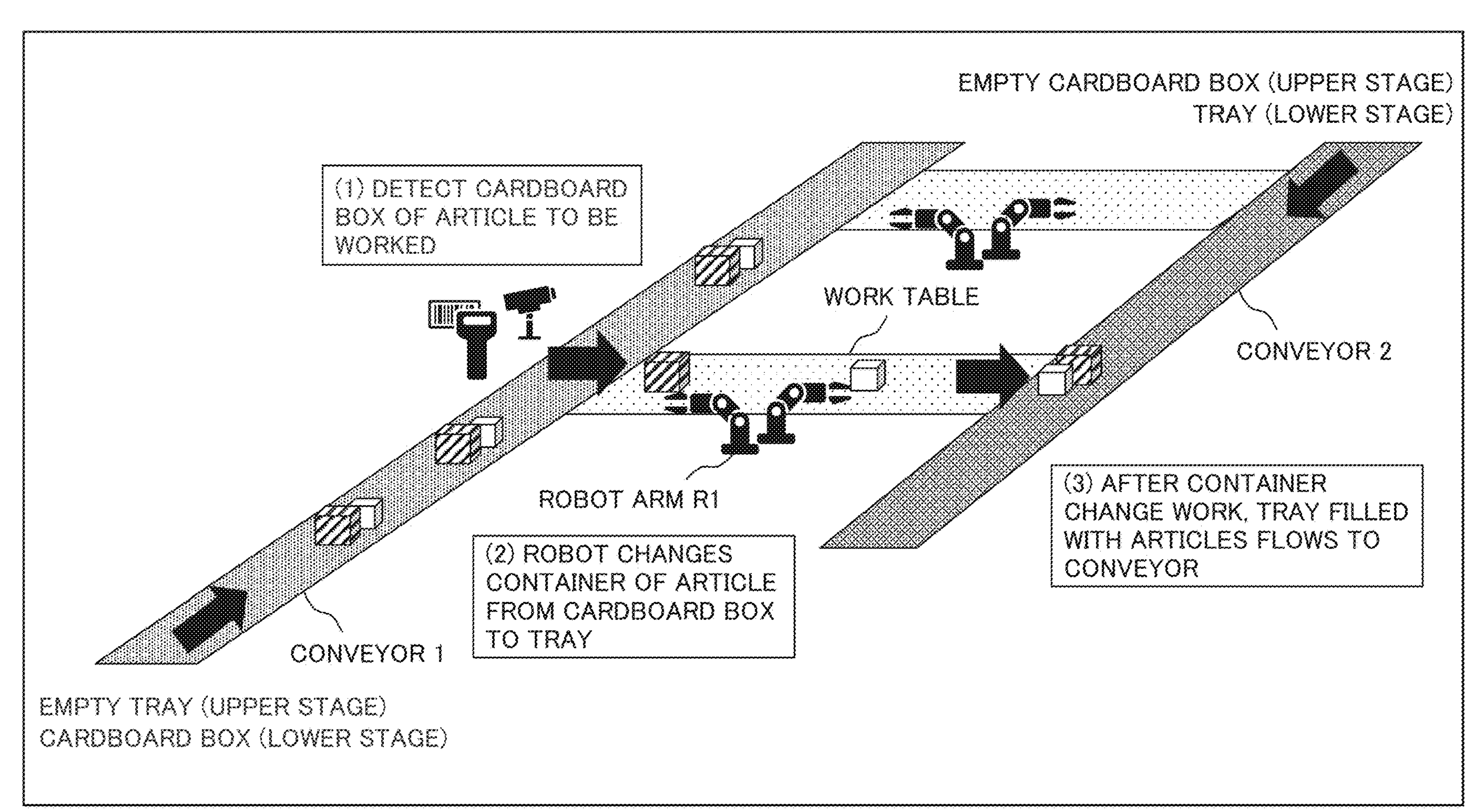
FIG. 1 is a diagram illustrating an example of work by a robot arm controlled by a control device.

An example of a series of work including an operation performed by a robot arm will be described with reference to FIG. 1. FIG. 1 is a schematic diagram illustrating an example of a series of work including an operation performed by a robot arm. A cardboard box filled with articles flown on a conveyor 1 and an empty tray are moved to a work desk at which a robot arm R1 performs work. The article handled by the robot arm R1 is specified by image recognition using an image captured by a camera or a barcode reader. The robot arm R1 performs preset work on the specified article. In FIG. 1, the robot arm R1 moves an article from a cardboard box to a tray. When the article is moved from the cardboard box to the tray, the cardboard box and the tray are caused to flow to a conveyor 2. This series of work is repeated for various articles. The example of the work of the robot arm controlled by the control device according to the present disclosure is not limited to the example of the container conversion of FIG. 1, and the control device according to the present disclosure may be applied to control of the robot arm that performs work of moving an article, such as picking an article.

In the example embodiment, an example of handling an article as in the example of FIG. 1 will be described in detail.

Figure 2:
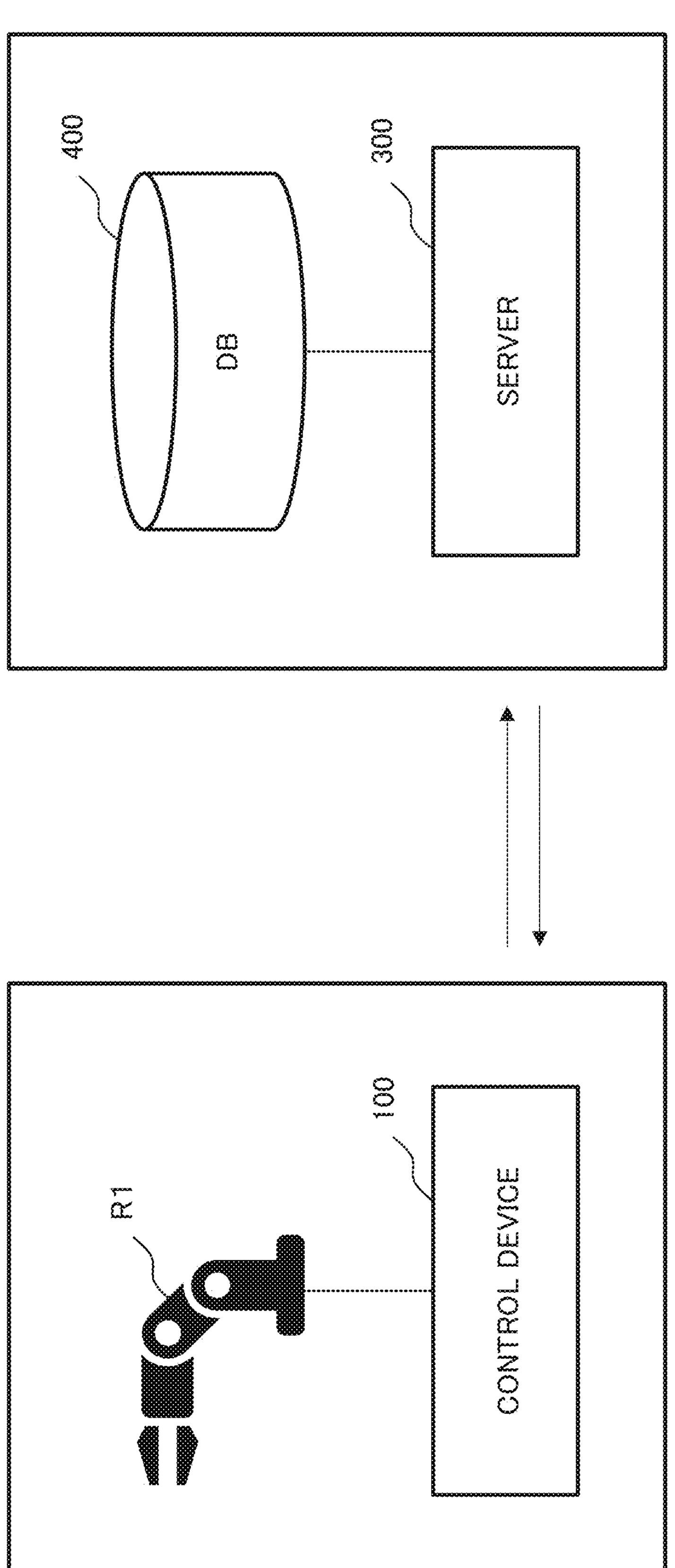
FIG. 2 is a diagram illustrating a configuration of a control system including the control device.

FIG. 2 is a diagram illustrating a configuration of a control system including the robot arm R1 and a server 300 used for controlling the robot arm R1.

In FIG. 2, the robot arm R1 can perform work of handling articles as described above. The robot arm R1 performs, for example, an operation of lifting an article, an operation of moving an article, and an operation of releasing an article. The type and specific structure of the robot arm R1 are not particularly limited as long as these operations can be performed. For example, the robot arm R1 is a six-axis robot arm having a function of holding an article at the distal end. The function of holding an article may be achieved by a known method such as suction of an article or gripping of an article. The robot arm R1 may include both a suction hand and a gripping hand as a function of holding an article. In the robot arm R1, a suction hand and a gripping hand may be replaced as a function of holding an article. The robot arm R1 may be fixed to a table, or may be provided in a self-propelled robot. A control device 100 may control one or more robot arms.

The server 300 reads work information performed by the robot arm R1 from a database 400 (hereinafter, also referred to as DB), and transmits the work information to the control device 100. The work information will be described later. A plurality of databases 400 may be provided.

The control device 100 controls the robot arm R1. As an example, the control device 100 is incorporated in the robot arm R1 described above, and controls the operation of the robot arm R1. The control device 100 is achieved by, for example, a computer to be described later. The control device 100 controls the operation of the robot arm using information regarding work of handling articles obtained from the server 300 and the database 400 and various sensor data obtained from various sensors (not illustrated). Each sensor (not illustrated) may be included in the robot arm R1, or may be provided outside the robot arm R1 and communicably connected to the control device 100.

Next, a functional configuration of the control device 100 will be described with reference to FIG. 3.

Figure 3:
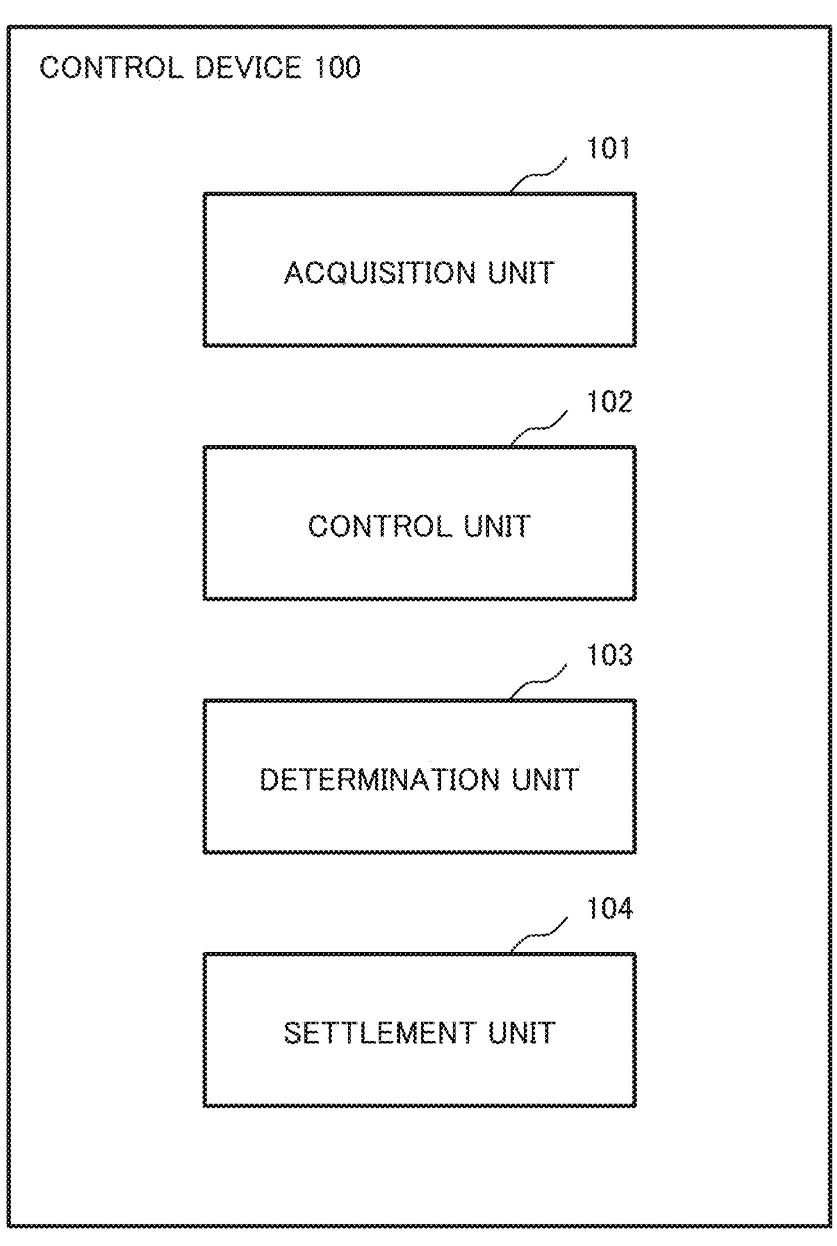
FIG. 3 is a block diagram illustrating a functional configuration of the control device.

FIG. 3 is a block diagram illustrating a functional configuration of the control device 100 according to the example embodiment. Referring to FIG. 1, the control device 100 includes an acquisition unit 101, a control unit 102, a determination unit 103, and a settlement unit 104. The acquisition unit 101 acquires work information including information on work performed by the robot arm and information on an article to be worked. The control unit 102 causes the robot arm to perform an operation of lifting up a predetermined unit of articles based on the work information. The determination unit 103 determines that there is a possibility that a plurality of articles are packaged together based on the sensor data obtained when the operation is being performed. In a case where it is determined that there is a possibility that a plurality of articles are packaged together, the settlement unit 104 settles a handling method for the article according to the sensor data.

Figure 4:
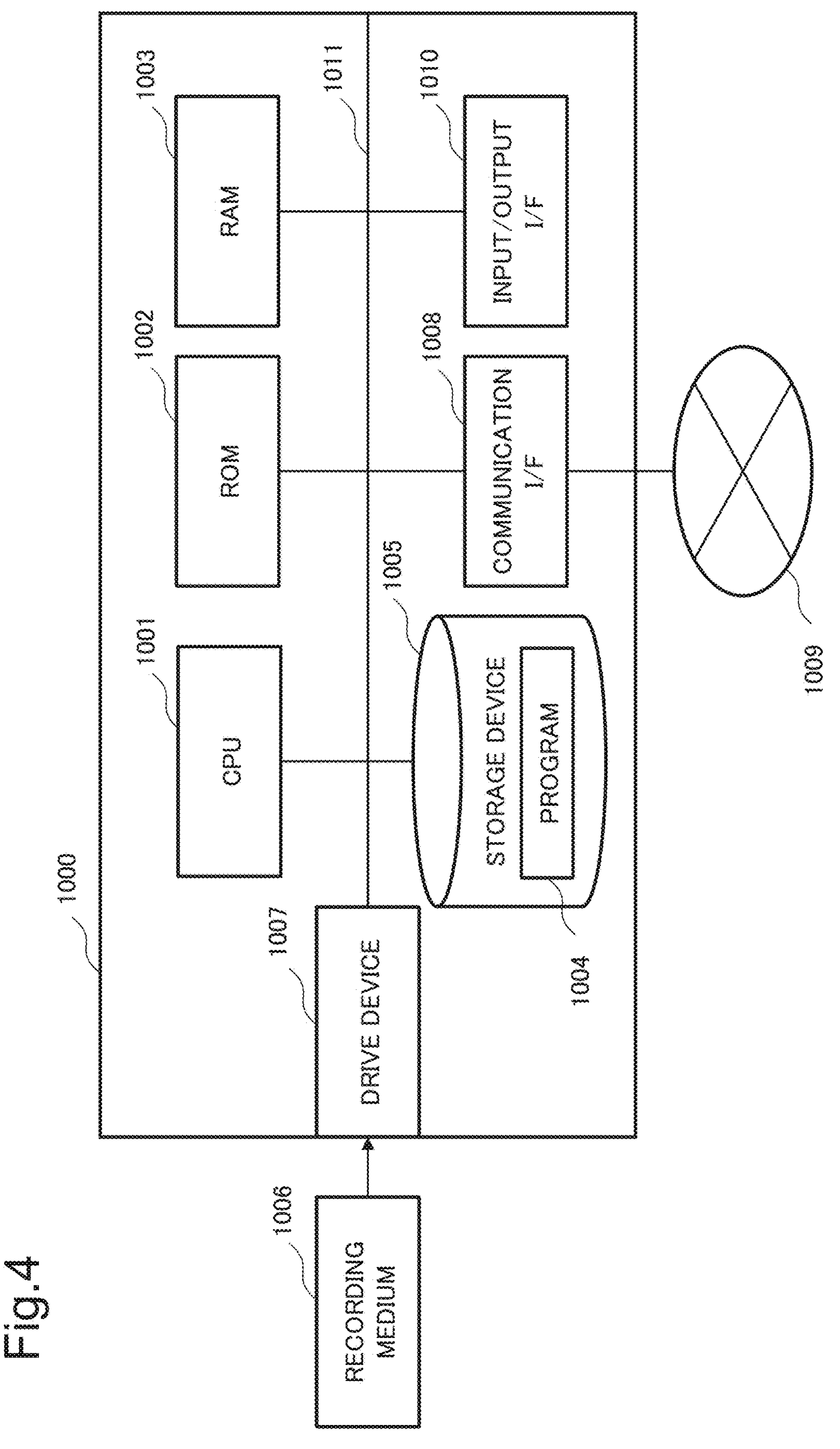
FIG. 4 is a diagram illustrating a hardware configuration in which the control device according to the present disclosure is implemented by a computer device and its peripheral devices.

A part or all of each component of the control device 100 is achieved by, for example, an arbitrary combination of an information processing device 1000 and a program as illustrated in FIG. 4. As an example, the information processing device 1000 includes the following configurations.

CPU (Central Processing Unit) 1001
ROM (Read Only Memory) 1002
RAM (Random Access Memory) 1003
Program 1004 loaded into RAM 1003
Storage device 1005 storing program 1004
Drive device 1007 for reading recording medium 1006
Communication I/F 1008 connected to communication network 1009
Input/output I/F 1010 for inputting/outputting data
Bus 1011 connecting each component The I/F is an abbreviation of Interface. The control device 100 is connected to the server 300 and the database 400 via the communication I/F 1008 and the communication network 1009. Furthermore, the above-described various sensors are connected to the control device 100 via the input/output I/F 1010. The sensor is, for example, a camera, a weight sensor, or a barcode reader. The sensor may be communicatively connected to the control device 100 via the robot arm R1. The control device 100 controls the operation of the robot arm using the information regarding the work of handling the article obtained from the server 300 and the database 400 and various sensor data input via the input/output I/F 1010.

Each component of each device or system in each example embodiment is achieved by the CPU 1001 acquiring and executing a program for realizing these functions. The program for achieving the function of each component of each device is stored in the storage device 1005 or the RAM 1003 in advance, for example, and is read by the CPU 1001 as necessary. The program 1004 may be supplied to the CPU 1001 via a communication network, or may be stored in advance in the recording medium 1006, and the drive device 1007 may read the program and supply the program to the CPU 1001. Specific implementation examples of the information processing device 1000 are various, and are not particularly limited.

The functional configuration of the control device 100 will be described with reference to FIG. 3 again.

The acquisition unit 101 is an example of an acquisition means that acquires work information including information on work performed by the robot arm and information on an article to be worked. The acquisition unit 101 acquires the work information from the database via a server communicably connected to the control device 100. For example, the acquisition unit 101 acquires the work information from the server when the control device 100 is activated. For example, when completing the work included in the work information, the acquisition unit 101 may acquire the work information regarding the next work from the server.

Here, the work information will be described.

Among the work information, the information on work is, for example, information indicating work contents, information indicating an article to be worked, and information indicating the number of articles to be worked. The information indicating work contents is information indicating an operation performed in the work. As a more detailed example, the information indicating work contents is, for example, information indicating that the work is container conversion, information indicating a container of a movement source in the container conversion, and information indicating a container of a movement destination in the container conversion. The information indicating the container of the movement source and the information indicating the container of the movement destination may be information indicating the position of the container of the movement source and information indicating the position of the container of the movement destination, respectively. The information indicating the article to be worked is identification information for identifying the article to be worked. The identification information of the article is, for example, an article identification (ID). The information indicating the number of articles to be worked is information indicating the number of articles to be worked in a group of works.

FIG. 5 is an example of the information on work. In the example of FIG. 5, container conversion is assumed as the work content. In FIG. 5, the information on work includes a work target article name, a work target article ID, the number of articles to be worked, a movement source of the article in the work, and a movement destination of the article in the work. The information on work is not limited to this example.

Among the work information, the article information is information indicating a feature of each article handled in the work. The information on the article is used to control a robot arm that handles the article. Among the information included in the article information, the information used for controlling the robot arm that handles the article includes physical information related to the handling of the article such as the size of the article and the weight of the article, but is not limited thereto. For example, the article information may include information indicating whether the article is a dangerous article or information indicating the fragility of the article. Further, the article information may include identification information for identifying the article.

FIG. 6 is an example of information of an article. In FIG. 6, the information on the article includes an article ID, an article name, a size of the article, and a weight of the article. The article information is not limited to this example.

The information on work and the article information included in the work information acquired by the acquisition unit 101 may be separate data as in the examples of FIGS. 5 and 6. In this case, the server may extract the article information to be worked using the identification information of the article included in the information on work, and transmit the information on work and the article information to the control device 100 as the work information. The information on work and the article information included in the work information acquired by the acquisition unit 101 may be one integrated data.

Next, the control unit 102 is an example of a control means that causes the robot arm to execute an operation of lifting up a predetermined unit of articles based on the work information. The predetermined unit of articles is the number of articles that the robot arm lifts in one operation, which is assumed in advance. The predetermined unit of articles is, for example, one article or two articles, but may be appropriately determined within a range in which handling by a robot arm is possible. The predetermined unit of articles may be set, for example, for each article and for each robot arm. The control unit 102 causes the robot arm to perform, based on the information on work, an operation of handling a predetermined unit of articles for performing the work indicated in the work information.

A known method may be used to control the robot arm. For example, the control unit 102 sets a position where the article is to be released based on the information on work out of the sensor data and the work information. For example, the control unit 102 sets a suction position or a gripping position of the article to be lifted, strength of suction or gripping, an operation speed, and the like based on the article information in the sensor data and the work information. The control unit 102 operates the robot arm. Then, the control unit 102 operates the robot arm using the set value.

When the operation of handling a predetermined unit of articles is executed, the control unit 102 controls the robot arm based on the size and weight of one article included in the article information. Normally, the article information does not include information regarding that the articles are packaged together. Therefore, the control unit 102 causes the operation of handling the predetermined unit of articles to be executed, but the control unit 102 may not appropriately handle the packaged together articles when executing the operation of handling the articles in the predetermined unit.

The determination unit 103 is an example of a determination means that determines that there is a possibility that a plurality of articles are packaged together based on sensor data obtained in a case where an operation is being performed. The case where the operation is being performed is a period from when the article to be worked is specified to when the operation is completed. The completion of the operation includes a case where the operation of lifting a predetermined unit of articles is performed based on the work information, but the article cannot be lifted for some reason. The sensor data is, for example, an image obtained by capturing the weight of the article to be lifted and the work range of the robot arm. The sensor data is not limited to these examples.

Here, the fact that a plurality of articles are packaged together will be described.

Collecting a plurality of articles means that the articles are packaged in several units. The articles may be packaged in units of sale, for example, for distribution, and further packaged in units. There are various types of packaging states of the article. Depending on the packaging state of the article, whether the robot arm can handle the article as it is and whether the robot arm can handle the article in a predetermined unit change. However, as described above, the information on the articles may not include information regarding that the articles are packaged together. In view of such circumstances, the present disclosure discloses a method for determining appropriate handling of an article in the absence of information regarding the article being packaged together.

Although details will be described later, whether the robot arm can handle the articles in a packaged together state also varies depending on the content of specific work included in the work information. For example, in the specific information on work included in the work information, when the number of articles to be worked is two and the articles are packaged together in units of six, it is necessary to take out two articles from the six packaged together articles by some method. That is, in this case, it is not possible to handle the six articles in a collective manner.

In the present example embodiment, a packaging state of an article will be described from two perspectives of a packaging material for collecting articles and a packaging surface covered with a packaging for collecting articles.

First, examples of the packaging material for collecting articles include a plastic film and paper. An example of packaging with a plastic film is shrink packaging in which the film is shrunk by heating to cover an article. Thickness, elongation, and ease of breakage vary depending on the packaging material. Accordingly, ease of removal of packaging varies depending on the packaging material. Since the slipperiness and the like are different depending on the packaging material, the easiness of adsorption and the easiness of gripping are different.

Next, the packaging surface covered with the packaging that collects the articles includes, for example, a case where the entire surface is covered and a case where the entire surface is not covered. Hereinafter, the packaging state of the article will be described with reference to FIGS. 7 to 10 illustrating an example of how to put the articles together. In FIGS. 7 to 10, the white portion is a portion covered with the packaging material, and the hatched portion is a portion not covered with the packaging material.

Figure 7:
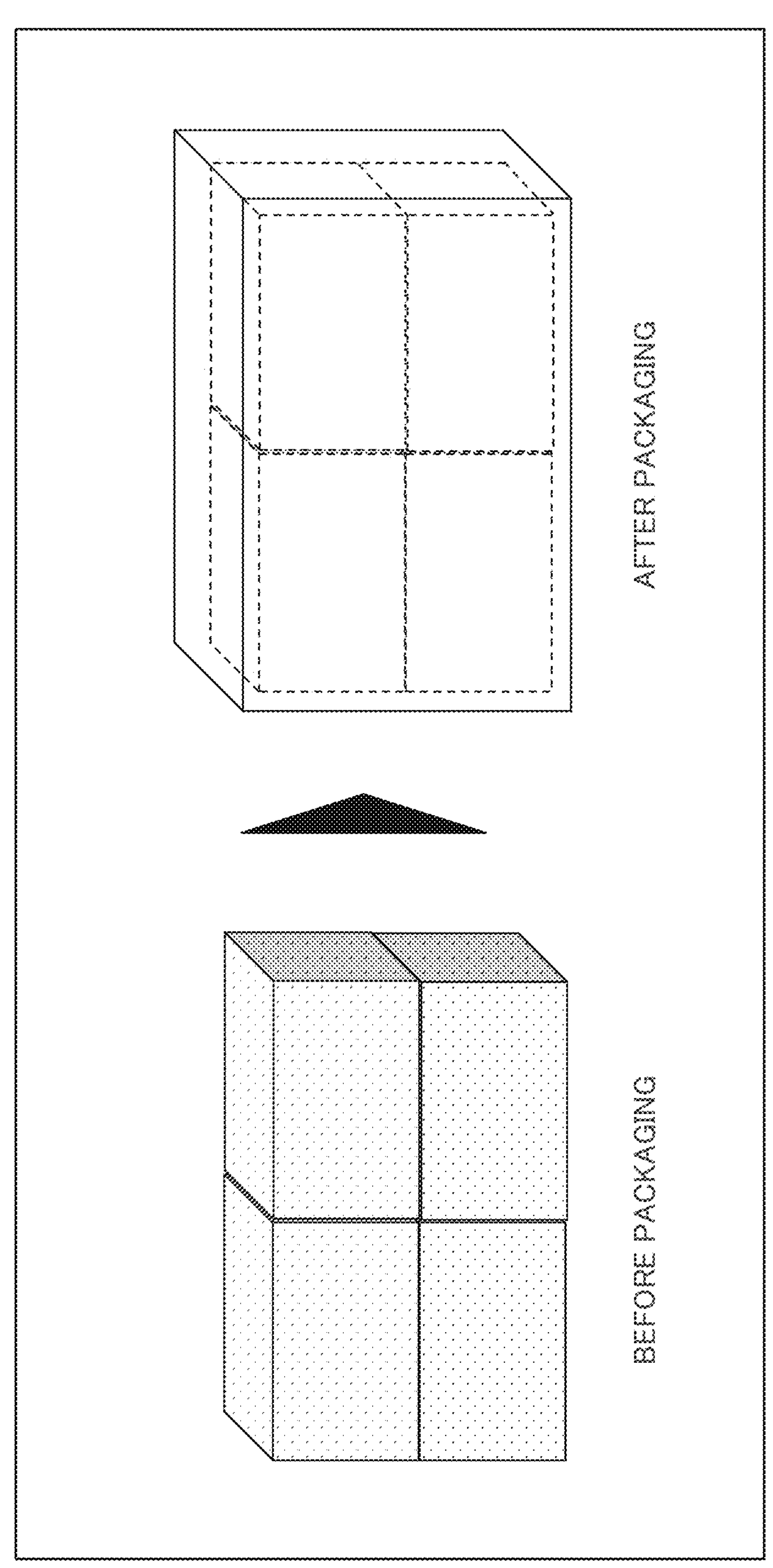
FIG. 7 is a diagram illustrating an example of a packaging state of an article.

In the example of FIG. 7, the entire surface of the packaged together articles is packaged together by the packaging material. As described above, the handling method for the article in which the entire surface is packaged together by the packaging material is a method of lifting the article in a packaged together state or a method of lifting the article in a predetermined unit after removing a part or all of the packaging material. An example of FIG. 7 is, for example, the shrink packaging described above.

Figure 8:
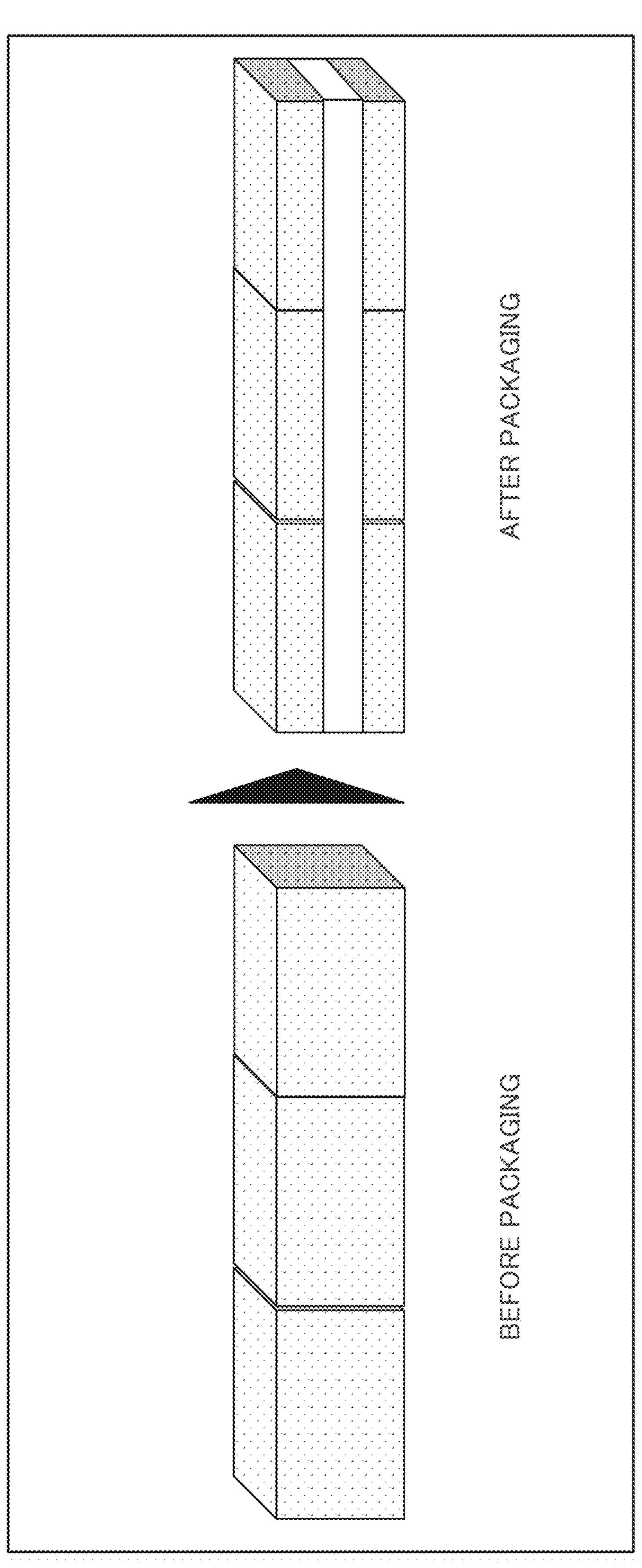
FIG. 8 is a diagram illustrating an example of a packaging state of an article.
Figure 9:
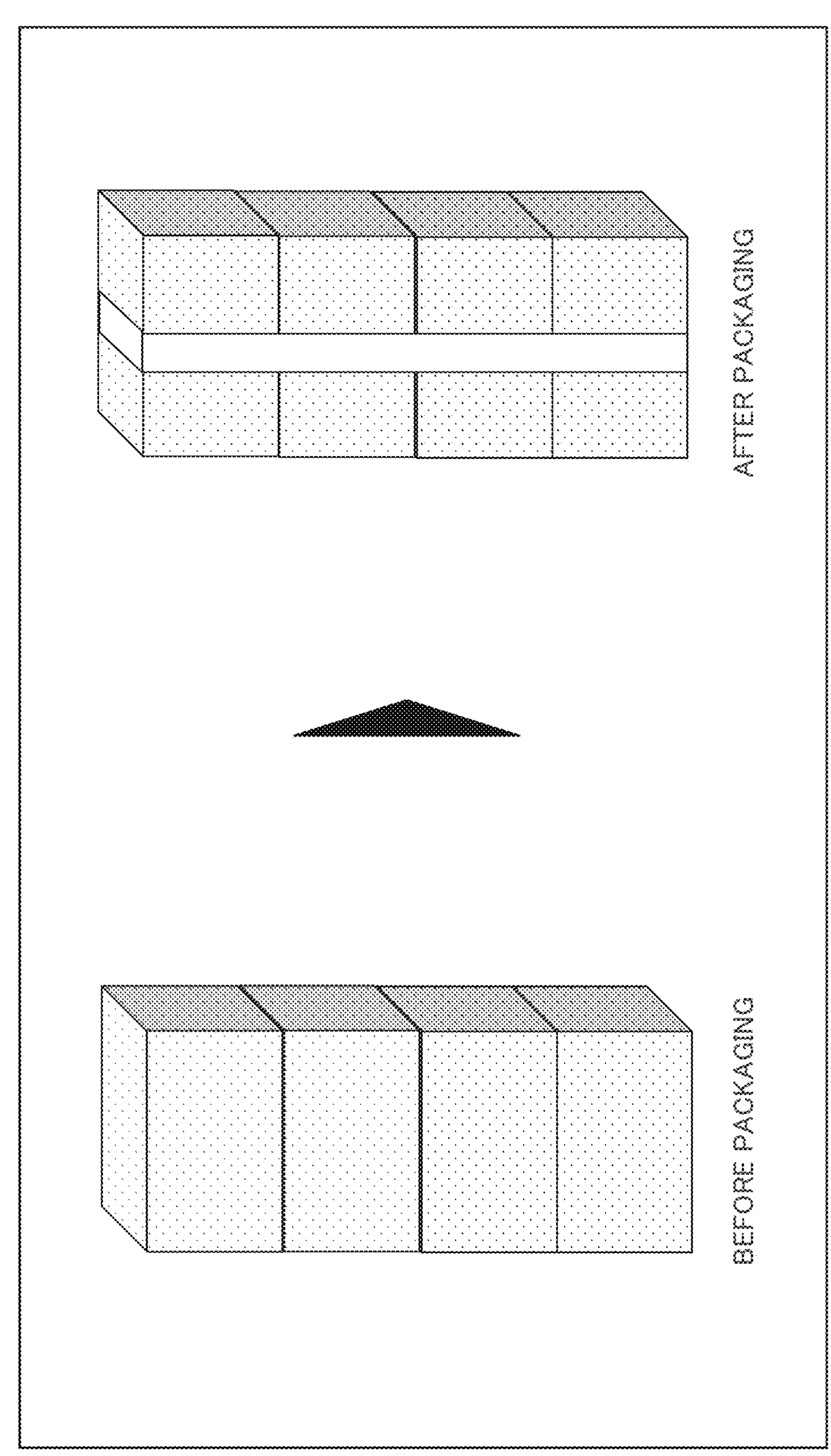
FIG. 9 is a diagram illustrating an example of a packaging state of an article.
Figure 10:
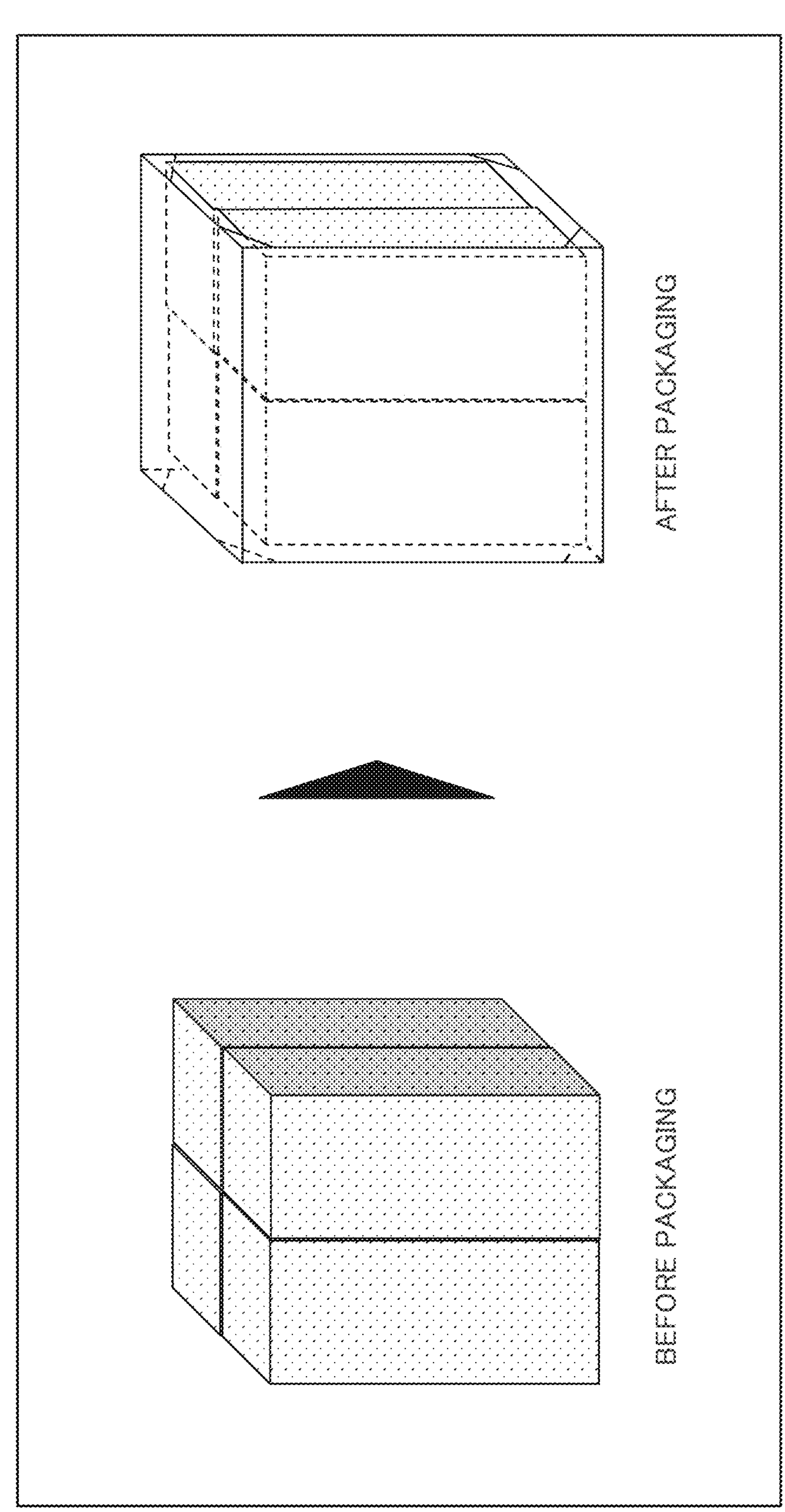
FIG. 10 is a diagram illustrating an example of a packaging state of an article.

On the other hand, in the examples of FIGS. 8, 9, and 10, some surfaces of the packaged together articles are packaged together by the packaging material.

In the example of FIG. 8, the side surface of the packaged together articles is covered with the packaging material, and the upper portion and the lower portion of the packaged together articles are not covered with the packaging material. In this case, the handling method for the packaged together articles is a method of taking out and lifting a predetermined unit of articles from an upper portion, a method of removing a part or all of the packaging material and then lifting the packaging material in a predetermined unit, or a method of lifting the packaging material while sandwiching the packaging material from a side surface and being packaged together.

In the example of FIG. 9, a part of the upper portion, the lower portion, and the side surface of the packaged together articles is covered with a packaging material having a smaller width than each surface, and the other part of the side surface of the packaged together articles is not covered with the packaging material. In this case, the handling method for the packaged together articles is a method of taking out and lifting a predetermined unit of articles from the side surface, a method of removing a part or all of the packaging material and then lifting the packaging material in a predetermined unit, or a method of lifting the articles while being packaged together. Regarding the method of taking out and lifting a predetermined unit of articles from the side surface, in the example of FIG. 9, there is a side surface that is not covered with an article on the outer side among the packaged together articles. Thus, in the example of FIG. 9, it is possible to take out a predetermined unit of articles from the side surface that is not covered. The examples of FIGS. 8 and 9 are achieved by, for example, a film or relatively thin paper. The packaging material in the examples of FIGS. 8 and 9 is, for example, a band for bundling banknotes or a tag band.

In the example of FIG. 10, a part of the upper portion, the lower portion, and the side surface of the packaged together articles is covered with the packaging material having the same width as each surface, and the other part of the side surface of the packaged together articles is not covered with the packaging material. In this case, the handling method for the packaged together articles is a method in which a part or all of the packaging material is removed and then lifted in a predetermined unit, or a method in which the packaging material is lifted while being packaged together. As compared with the example of FIG. 9, in the example of FIG. 10, the side surface of the article on the outer side among the packaged together articles is partially covered. Thus, in the example of FIG. 10, depending on the packaging material, a predetermined unit of articles cannot be taken out of the side surface that is not covered. Alternatively, in the example of FIG. 10, depending on the packaging material, if a predetermined unit of articles is taken out of the side surface that is not covered, the article may be recessed. Therefore, in the example of FIG. 10, it is difficult to adopt a method of taking out and lifting a predetermined unit of articles from the side surface as a method of handling the packaged together articles. The example of FIG. 10 is, for example, packaging with thick paper in which beer cans are packaged together in units of 6 cans or the like.

Furthermore, in the packaging state of the article, the tightness and looseness of packaging may be different. The ease of removal of the packaging, the ease of taking-out when the side surface is not covered, and the like vary depending on the tightness or looseness of the packaging. The packaging state of the article is not limited to these examples. For example, the number of packaged together articles and how the packaged together articles are arranged are not limited to the examples of FIGS. 7 to 10. The shape of the article is not limited to the examples of FIGS. 7 to 10.

The determination unit 103 detects the packaging state of the article described so far based on the obtained sensor data. For example, the determination unit 103 compares an image obtained by photographing an article to be worked at the time of performing an operation with an image of one unpackaged article. As a result of the comparison, a portion having a surface state different from that of the image of one article may be detected as a portion where the article is packaged. For example, even in a case where the articles are packaged together, the determination unit 103 may not necessarily detect the packaging state of the article depending on the situation, such as a case where a predetermined unit of articles can be handled.

Next, an example of a specific process of determination by the determination unit 103 will be described.

First, the determination unit 103 acquires sensor data in a case where an operation of lifting a predetermined unit of articles is performed. The determination unit 103 determines whether the obtained sensor data conforms to the sensor data in a case where a predetermined unit of articles is lifted. The determination unit 103 may determine that there is a possibility that the articles are packaged together in a case where the obtained sensor data does not conform to the sensor data in a case where the operation of lifting up a predetermined unit of articles is performed. For example, in a case where the obtained sensor data does not conform to the sensor data in a case where the operation of lifting one article, which is a predetermined unit, is performed, and is twice or more the sensor data in a case where one article is lifted, the determination unit 103 may determine that there is a possibility that the articles are packaged together. Alternatively, the determination unit 103 may determine that there is a possibility that the articles are packaged together in a case where the obtained sensor data does not conform to the sensor data in a case where the operation of lifting up a predetermined unit of articles is performed and conforms to the sensor data in a case where the number of articles is an integral multiple of the number of the sensor data in a case where one article is lifted. This is because it is considered that the articles are packaged together, and the robot arm performs the lifting operation on the articles as packaged together. The case of conforming to the sensor data in a case where an integral multiple number of articles are lifted may be a case of conforming within an error range. In the present example embodiment, the integral multiple does not include one.

A specific example of a method in which the determination unit 103 determines whether the obtained sensor data conforms to the sensor data in a case where a predetermined unit of articles is lifted in the processing of the determination unit 103 will be described. For example, the determination unit 103 determines whether the sensor data obtained from a force sensor or a weight sensor included in the robot arm conforms to sensor data stored in advance in a case where a predetermined unit of articles is lifted. It is only required to determine whether the sensor data is conformable within the error range. The sensor data in a case where the predetermined unit of articles is lifted may be an actual measurement value in a case where the predetermined unit of articles is actually lifted, or may be an estimation value estimated from the article information. The estimation value is estimated, for example, from the weight of the article among the article information. The sensor data in a case where a predetermined unit of articles is lifted may be stored in advance in a storage unit (not illustrated) of the control device 100. Alternatively, the sensor data in a case where a predetermined unit of articles is lifted may be associated with the article information included in the work information.

By this determination, the determination unit 103 can determine whether the robot arm has lifted a predetermined unit of articles. The case where the robot arm has not lifted the predetermined unit of articles is, for example, a case where the robot arm has not lifted anything, a case where the robot arm has not appropriately lifted the article including dropping the article to be lifted, and a case where the robot arm has lifted the article more than the predetermined unit by lifting the article in a packaged together state.

For example, in a case where the sensor data obtained from the force sensor or the weight sensor included in the robot arm is sensor data in a case where the robot arm does not lift the article even though the robot arm is performing the operation of lifting the article, the determination unit 103 may determine that the articles are packaged together. This is because, when the articles are packaged together, the articles have an unexpected weight and size, and thus may not be lifted by the operation of lifting a predetermined unit of articles. Therefore, when determining that the robot arm does not lift the article, the determination unit 103 may determine that there is a possibility that the unlifted articles are packaged together.

In the processing of the determination unit 103, a specific example of a method in which the determination unit 103 determines whether the obtained sensor data conforms to sensor data in a case where an integral multiple of one article is lifted will be described. For example, the determination unit 103 determines whether sensor data obtained from a force sensor or a weight sensor included in the robot arm, a camera, an ultrasonic sensor, an infrared sensor, or the like included in the robot arm or the periphery of the robot arm matches an integer multiple of sensor data stored in advance when one article is lifted. It is only required to determine whether the sensor data is conformable within the error range. The sensor data in a case where one article is lifted may be an actual measurement value or an estimation value similarly to the sensor data in a case where a predetermined unit of articles are lifted, and may be included in the storage unit or the article information. The estimation value is estimated, for example, from the weight of the article or the size of the article among the article information.

In a case where the obtained sensor data conforms to the sensor data stored in advance in a case where an integral multiple of the sensor data when one article is lifted is lifted, the determination unit 103 determines that there is a possibility that the articles are packaged together. For example, in a case where the sensor data is the size of the article detected from the image in which the robot arm lifts the article, in a case where the size of the article matches a value of an integral multiple of the size of one article, the determination unit 103 determines that there is a possibility that the articles are packaged together.

In a case where the determination unit 103 determines whether the obtained sensor data conforms to the sensor data in a case where the number of articles is an integral multiple of one article, the determination unit 103 can also estimate the number of the articles packaged together. The estimation of the number of packaged together articles based on the sensor data may be performed by the settlement unit 104. For example, the determination unit 103 may estimate the smallest number of packaged together articles that can be estimated from the obtained sensor data based on the size of the packaged together articles included in the image of the article before lifting captured from the upper portion, which is the obtained sensor data. Here, the smallest number is estimated because the downward (depth direction with respect to the image) size of the article cannot be captured in the image captured from the upper portion, and thus it is not possible to estimate how many steps are overlapped on the lower side.

In comparison with a case where the determination unit 103 determines whether the obtained sensor data conforms to the sensor data in a case where a predetermined unit of articles are lifted, in a case where the determination unit 103 further determines whether the obtained sensor data conforms to the sensor data in a case where an integral multiple of one article is lifted, it is possible to determine that the obtained sensor data is more reliably packaged together. This is because a case where the article is not lifted includes a case where the article is not lifted due to other factors in addition to the fact that the articles are packaged together and the weight and size are unexpected. That is, in a case where the determination unit 103 determines that the articles are packaged together because the articles have not been lifted, the determination unit 103 may determine that there is a possibility that the articles are packaged together even in a case where the articles have not been lifted due to other factors other than the weight of the articles or the size of the articles. The other factors include, for example, that the surface of each article is an unexpected material, that the position at which the article is to be lifted is wrong, and the like. For example, in a case where the surface of each article is an unexpected material, the suction mechanism or the gripping mechanism may slip, and the article may not be lifted. For example, in a case where the position at which the article is to be lifted is wrong, the article may not be lifted depending on the position of the center of gravity.

The functional configuration of the control device 100 will be described with reference to FIG. 3 again.

The settlement unit 104 is an example of a settlement means that, in a case where it is determined that there is a possibility that a plurality of articles are packaged together, settles a handling method for the article according to the sensor data. In a case where it is determined that there is a possibility that a plurality of articles are packaged together, the settlement unit 104 settles the handling method for the article as a handling method for causing the robot arm to execute the settled operation or a handling method for notifying the manager according to the sensor data and the work information. For example, the settlement unit 104 may settle the handling method by referring to information in which the determination result and the handling method according to the determination result are associated according to the determination result determined by the determination unit 103 based on the sensor data.

In a case where the settlement unit 104 settles the handling method for causing the robot arm to execute the settled operation, the determination unit instructs the control unit 102 to cause the robot arm to execute the operation of lifting the article by the settled operation.

In a case where it is not determined that there is a possibility that a plurality of articles are packaged together, the settlement unit 104 may settle to cause the robot arm to execute work targeting a predetermined unit of articles. Alternatively, in a case where it is not determined that there is a possibility that a plurality of articles are packaged together, the control unit 102 may continue control to cause the robot arm to execute an operation of executing work according to the work information based on the determination result.

For example, the settlement unit 104 settles the handling method based on the number of articles to be worked included in the work information and the number of packaged together articles estimated from the sensor data.

In a case where the number of the plurality of articles based on the sensor data is equal to or less than the number of articles to be worked included in the work information, the settlement unit 104 settles to cause the robot arm to execute an operation of lifting the plurality of articles as a handling method. The operation of lifting the plurality of articles may be an operation of lifting a predetermined unit of articles without changing the lifting operation in a case where it is determined that the article has been lifted. The operation of lifting the plurality of articles may be an operation of lifting an article larger or heavier than a case of lifting a predetermined unit of articles in a case where it is determined that the article has not been lifted. The operation of lifting an article larger or heavier than the case of lifting a predetermined unit of articles may be an operation of increasing the number of lifting robot arms, an operation of increasing the number of suction mechanisms or gripping mechanisms, or an operation of increasing the suction strength of the suction mechanism or the gripping strength of the gripping mechanism.

On the other hand, in a case where the number of the plurality of articles based on the sensor data is larger than the number of the articles to be worked included in the work information, the settlement unit 104 settles to change the operation of taking out the predetermined unit of articles based on the sensor data and to cause the robot arm to execute the operation as the handling method. In this case, the settlement unit 104 may settle to change the operation of taking out a predetermined unit of articles and cause the robot arm to execute the operation according to the packaging state of the plurality of articles packaged together based on the sensor data.

Specifically, the packaged together articles may be able to be removed from the side as in the example of FIG. 9. Therefore, the settlement unit 104 may settle a handling method of performing an operation of sucking or gripping the side surface of the article and taking out the article in the lateral direction, and then lifting up a predetermined unit of articles. In the handling method for executing the operation of taking out the article in the lateral direction, there is a case where there is no place where the robot arm operates in the lateral direction of the packaged together article. In this case, the settlement unit 104 may settle a handling method for executing an operation of lifting the packaged together articles and moving the packaged together articles to a place where the operation of taking out the article in the lateral direction is possible before taking out the article.

Alternatively, as in the example of FIG. 8, the article may be taken out from the upper surface. For this reason, the settlement unit 104 may settle a handling method of executing an operation of lifting up a predetermined unit of articles by sucking or gripping the side surface of the article to take out the article. In a case where the article is taken out while being packaged in this manner, the settlement unit 104 may settle a handling method of executing an operation of taking out and lifting the article while pressing the surrounding article by another robot arm.

A case will be described in which the settlement unit 104 settles a handling method in accordance with the packaging state of the plurality of articles packaged together based on the sensor data. For example, the settlement unit 104 specifies a surface on which the article is packaged or a surface on which the article is not packaged in the packaging state based on the image that is the sensor data. For example, in the case of the packaging state as in the example of FIG. 9, it can be seen that a part of the article is covered with the packaging material in the image photographed from the upper portion. In this case, there is a possibility that the surface extending in the depth direction from the side not covered with the packaging material of the article is not covered with the packaging material. Therefore, the settlement unit 104 may settle a handling method of performing an operation of sucking or gripping the side surface of the article to take out the article in the lateral direction, and then lifting up a predetermined unit of articles.

Similarly, in a case where the number of the plurality of articles based on the sensor data is larger than the number of the articles to be worked included in the work information, the settlement unit 104 may settle to cause the robot arm to execute the operation of removing the packaging of the articles and the operation of taking out the articles as a handling method according to the packaging state of the plurality of articles packaged together based on the sensor data. The operation of removing the packaging may be, for example, an operation of cutting a part of the packaging or an operation of removing the packaging by nipping and pulling a part of the packaging. The operation of cutting a part of the packaging may include using a robot arm including an end effector capable of cutting the packaging material, or replacing the end effector of the robot arm with an end effector capable of cutting the packaging material. The operation of removing the packaging may be an operation in which at least one surface of the packaged together articles is not covered with the packaging material. The handling method in this case is a method of executing an operation of taking out a predetermined unit of articles from the surface from which the packaging has been removed after the operation of removing the packaging.

Similarly, in a case where the number of the plurality of articles based on the sensor data is larger than the number of the articles to be worked included in the work information, the settlement unit 104 may settle, as the handling method, notifying the manager that there is a possibility that the plurality of articles are packaged together. For example, the settlement unit 104 notifies a terminal used by the manager that there is a possibility that a plurality of articles are packaged together.

Figure 11:
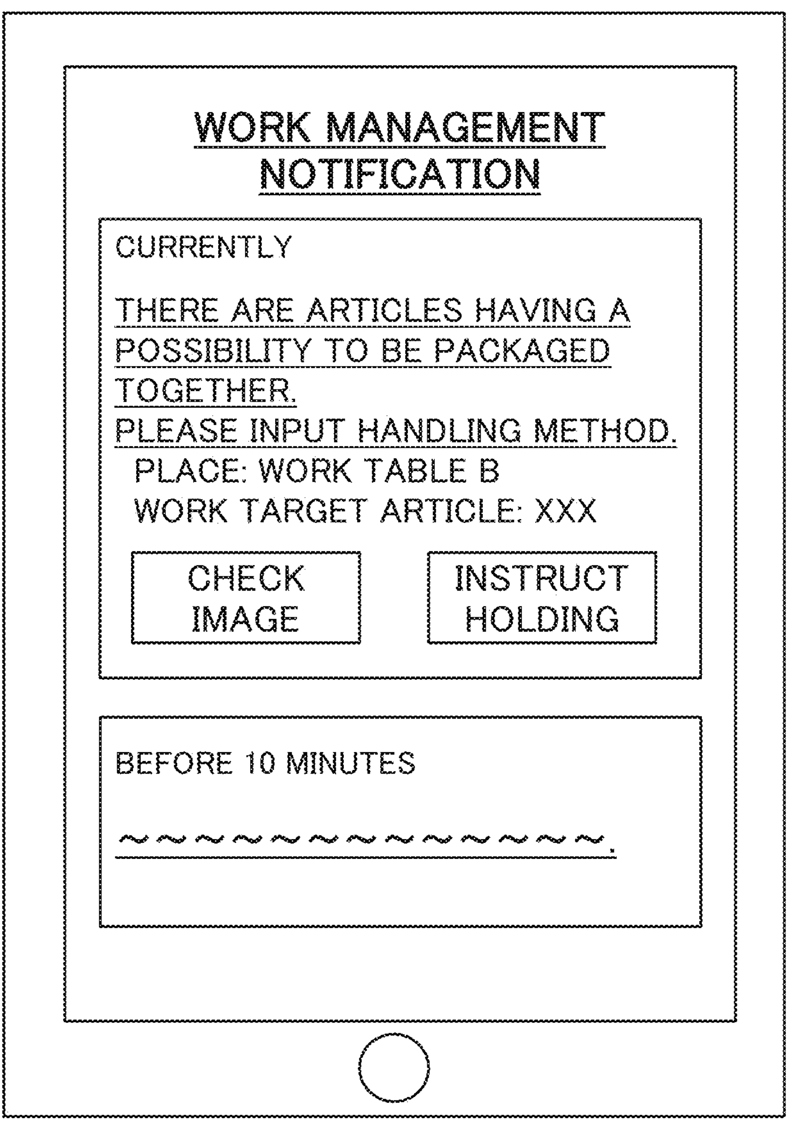
FIG. 11 is an example of a notification screen.

FIG. 11 is an exemplary notification screen for the manager. The notification screen includes, for example, information indicating an occurrence time, existence of articles that may be packaged together, a work place, a work target article, and the like. The notification screen may include information for inputting a handling method. In the example of FIG. 11, a button for instructing suspension of work and a button for confirming an image are included. These are examples of information for inputting a handling method. An image confirmation button is a button for causing the manager to confirm the image in order to input a handling method.

Specifically, the instruction to suspend the work may be to avoid the article to be worked. For example, the instruction to suspend the work may be to flow the article to be worked on the conveyor belt while being contained in the container of the movement source. Alternatively, the instruction to suspend the work may be to move the article to be worked to the outside of the work desk.

Figure 12:
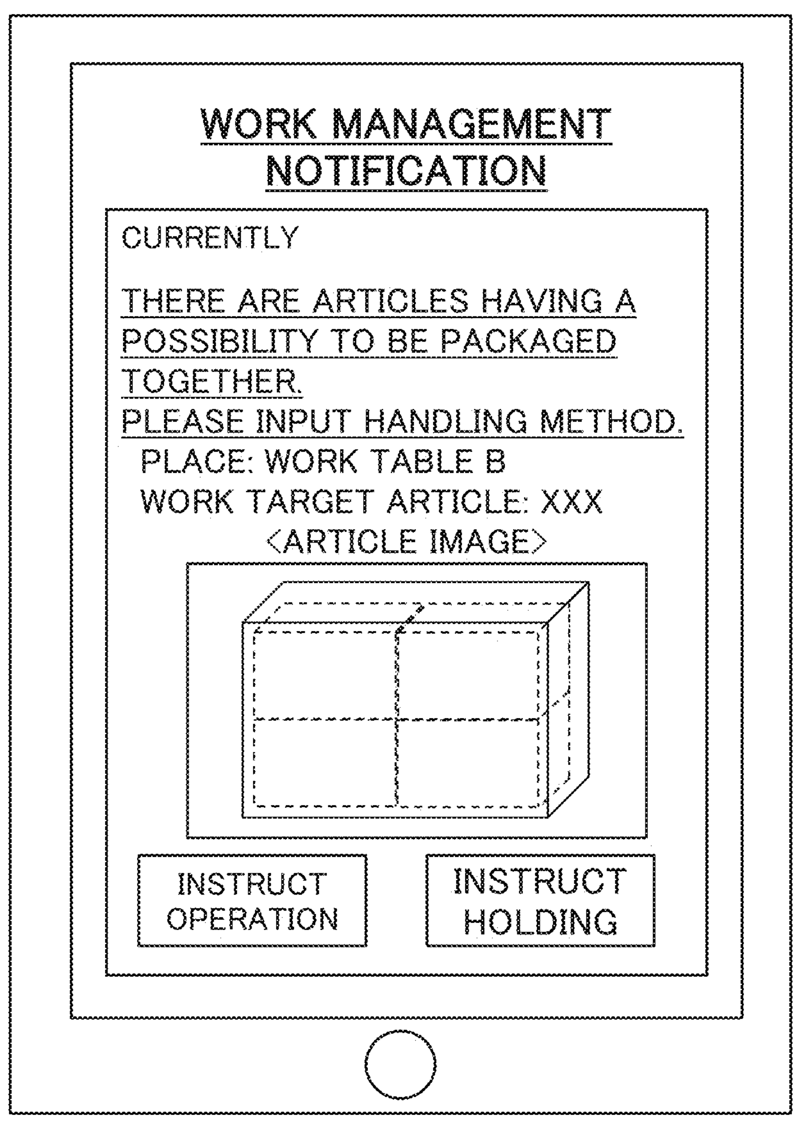
FIG. 12 is an example of the notification screen.

FIG. 12 illustrates an example of a notification screen displayed on the terminal used by the manager when the image confirmation button is selected. The notification screen is displayed so that the manager can confirm the image. The notification screen includes a button for instructing an operation and a button for instructing suspension of work, which are selected by the manager according to the image. When a button for instructing an operation is selected, the operation to be instructed may be displayed in a selectable manner, for example, in a drop-down form. In this case, the control unit 102 causes the robot arm to execute the operation to be executed on the packaged together articles acquired from the manager.

The notification screen example and the method of inputting the handling method to the manager are not limited to these examples.

The method in which the settlement unit 104 settles the handling method based on the number of articles to be worked included in the work information and the number of packaged together articles estimated from the sensor data has been described above. The settlement unit 104 may settles the handling method to be the above-described various handling methods according to not only the comparison result between the number of articles to be worked included in the work information and the number of packaged together articles estimated from the sensor data but also other conditions.

For example, the settlement unit 104 may settle the handling method according to whether the packaged together articles can be lifted. Whether the packaged together articles can be lifted may be a determination result as to whether the packaged together articles can be lifted by the operation of lifting a predetermined unit of articles determined by the determination unit 103 described above. Whether the packaged together articles can be lifted may include a determination result as to whether the packaged together articles can be lifted, the determination result being determined by the determination unit 103 based on the sensor data obtained in a case where the operation is changed according to the size or weight of the packaged together article.

For example, in a case where there is a possibility that the articles are packaged together, the settlement unit 104 may settle a handling method of notifying the manager. Alternatively, the settlement unit 104 may settle a handling method of notifying the manager in a case where the packaging in which the articles are packaged together cannot be removed. For example, the determination unit 103 may determine that the article has not been lifted as that the package cannot be removed based on the sensor data of an operation of lifting a predetermined unit of articles after the operation of removing the packaging is performed.

An example of a settlement method of the settlement unit 104 will be described later with reference to a flowchart.

The operation of the control device 100 configured as described above will be described with reference to the flowchart of FIG. 13.

FIG. 13 is a flowchart illustrating an outline of the operation of the control device 100 according to the example embodiment.

First, the acquisition unit 101 acquires work information including information on work performed by the robot arm and information on an article to be worked (step S101).

Next, the control unit 102 causes the robot arm to perform an operation of lifting up a predetermined unit of articles based on the work information (step S102).

Next, the determination unit 103 determines that there is a possibility that a plurality of articles are packaged together based on the sensor data obtained in a case where the operation is being performed (step S103).

In a case where it is determined in step S103 that there is a possibility that a plurality of articles are packaged together (step S103: Yes), in a case where it is determined that there is a possibility that a plurality of articles are packaged together, the settlement unit 104 settles a handling method for the articles according to the sensor data (step S104). Then, in a case where the handling method is settled to be the handling method of notifying the manager, the settlement unit 104 notifies the manager. In a case where the handling method is settled to be the handling method for operating the robot arm, the settlement unit 104 causes the control unit 102 to control the robot arm by the settled handling method.

In a case where it is not determined in step S103 that there is a possibility that the plurality of articles are packaged together (step S103: No), the robot arm is caused to execute the work targeting the predetermined unit of articles following the operation of lifting the predetermined unit of articles in step S102 (step S105).

As described above, the control device 100 ends a series of operations.

Next, FIG. 14 is a flowchart illustrating an example of processing of the determination unit 103 and the settlement unit 104.

First, the determination unit 103 acquires sensor data in the operation of lifting the article (step S201).

Next, the determination unit 103 determines whether the robot arm has lifted the article based on the sensor data (step S202). In a case where it is determined in step S202 that the robot arm has not lifted the article, the process proceeds to step S203. In a case where it is determined in step S202 that the robot arm has lifted the article, the process proceeds to step S204.

In a case where it is determined in step S202 that the robot arm has not lifted the article (step S202: No), and the operation of lifting the article is changed, it is determined whether the robot arm has lifted the article (step S203). In a case where it is determined in step S203 that the robot arm has not lifted the article, the process proceeds to step S207. In a case where it is determined in step S203 that the robot arm has not lifted the article, the determination unit 103 may determine that there is a possibility that the articles are packaged together. In a case where it is determined in step S202 that the robot arm has lifted the article, the process proceeds to step S204.

An example of more specific processing in step S203 will be described. First, the settlement unit 104 settles a handling method for causing the robot arm to execute the changed lifting operation according to the sensor data and the work information. The control unit 102 causes the robot arm to perform an operation of lifting the article with the changed operation. The determination unit 103 may determine whether the robot arm has lifted the article by the changed operation based on the sensor data in a case where the changed operation is performed.

In a case where it is determined in step S202 or step S203 that the article has been lifted (step S202: Yes or step S203: Yes), the determination unit 103 determines whether the weight of the lifted article is twice or more the weight of one article based on the sensor data in a case where the article has been lifted (step S204). That is, the determination unit 103 determines whether there is a possibility of being packaged together. Whether the weight is twice or more may be determined in consideration of the error range and the addition of the weight of the packaging material in the case of being packaged together. In a case where it is determined in step S204 that the weight of the article lifted by the robot arm is twice or more the weight of one article, the process proceeds to step S205. In a case where it is determined that the weight is twice or more the weight of one article, the determination unit 103 may determine that there is a possibility that the articles are packaged together. In a case where it is determined in step S204 that the weight of the article lifted by the robot arm is not twice or more the weight of one article, the process proceeds to step S209. In a case where it is determined that the weight is twice or more the weight of one article, the determination unit 103 may determine that there is no possibility that the articles are packaged together.

In a case where it is determined in step S204 that the weight of the lifted article is twice or more the weight of one article (step S204: Yes), the determination unit 103 determines whether the number of packaged together articles can be estimated based on the sensor data (step S205). For example, the determination unit 103 may determine whether the number of packaged together articles can be estimated based on whether sensor data used to estimate the number of packaged together articles, such as the weight or image of the lifted article, has been acquired. In a case where it is determined in step S205 that the number can be estimated, the process proceeds to step S206. In a case where it is determined in step S205 that the number cannot be estimated, the process proceeds to step S210.

In a case where it is determined in step S205 that the number of packaged together articles can be estimated (step S205: Yes), the determination unit 103 determines whether the number of packaged together articles is equal to or less than the number of articles to be worked included in the work information (step S206). In a case where it is determined in step S206 that the number of packaged together articles is equal to or less than the number of articles to be worked included in the work information, the process proceeds to step S209. In a case where it is determined in step S206 that the number of packaged together articles is not equal to or less than the number of articles to be worked included in the work information, the process proceeds to step S207.

An example of more specific processing in step S206 will be described. First, the determination unit 103 estimates the number of packaged together articles based on sensor data obtained in a case where the article is lifted. More specifically, the determination unit 103 calculates how many times the weight of the lifted article or the size of the lifted article detected from the image of the lifted article is information of one article. Then, in a case where the size of the lifted article detected from the image of the lifted article is n times the information of one article, the determination unit 103 determines that n articles are packaged together. It is assumed that the weight and size of the packaged together articles include the weight and size of the packaging material for packaging the packaged together article. Therefore, when the size of the lifted article detected from the image of the lifted article is n times the information of one article, it may be estimated that the number of articles is n by discarding the decimal places. Also in this estimation, the determination unit 103 may make a determination in consideration of the error range. After the number of packaged together articles is estimated, the determination unit 103 may determine whether the estimated number is equal to or less than the number of articles to be worked included in the work information by comparing the estimated number with the number of articles to be worked included in the work information.

Next, in a case where the article has not been lifted in step S203 (step S203: No), or in a case where it is determined in step S206 that the number of packaged together articles is larger than the number of articles to be worked included in the work information (step S206: Yes), the determination unit 103 determines whether the packaging can be removed by the robot arm (step S207). In a case where it is determined in step S207 that the packaging can be removed, the process proceeds to step S208. In a case where it is determined in step S207 that the packaging cannot be removed, the process proceeds to step S209. When it cannot be determined whether the packaging can be removed, the process may proceed to step S209.

An example of more specific processing in step S207 will be described. For example, the settlement unit 104 first settles to perform the operation of removing the packaging, and thereafter, determines to perform the operation of lifting up a predetermined unit of articles again. The operation of removing the packaging may be, for example, an operation of holding the article with one robot arm and holding and pulling the packaging material with another robot arm. Alternatively, the operation of removing the packaging may be an operation of cutting the packaging material by the robot arm as long as the use of the knife on the article is not limited. The determination unit 103 determines whether the predetermined unit of articles has been lifted based on the sensor data obtained in a case where the operation of lifting the predetermined unit of articles after the operation of removing the packaging is performed is performed. In a case where it is determined that the article has been lifted, the determination unit 103 may determine that the packaging has been removed. In a case where it is determined that the article has not been lifted, the determination unit 103 may determine that the packaging has not been removed.

In a case where it is determined in step S207 that the packaging can be removed (step S207: Yes), the settlement unit 104 settles, as a handling method, removing the packaging of the article, and further causing the robot arm to execute the operation on the predetermined unit of articles according to the work information (step S208). Then, the control unit 102 controls the robot arm by the settled handling method. Here, a series of processing by the determination unit 103 and the settlement unit 104 ends.

In a case where it is determined in step S204 that the lifted weight is not twice or more the weight of one article (step S204: No), the settlement unit 104 settles to cause the robot arm to execute an operation on a predetermined unit of articles based on the work information (step S209). Then, the control unit 102 controls the robot arm by the settled handling method. Here, a series of processing by the determination unit 103 and the settlement unit 104 ends.

In step S205, in a case where the number of packaged together articles cannot be estimated (step S205: No), or in a case where it is determined in step S207 that the packaging cannot be removed (step S207: No), the settlement unit 104 notifies the manager that there is a possibility that the articles are packaged together (step S210). In step S210, the settlement unit 104 may notify information for inputting a handling method in addition to the possibility that the articles are packaged together. The settlement unit 104 generates and transmits notification information to the manager.

In a case where the handling method is input by the manager in response to the notification to the manager in step S210, the settlement unit 104 settles to cause the robot arm to execute an operation according to the input handling method (step S211). The control unit 102 causes the robot arm to execute an operation according to the input handling method. Here, a series of processing by the determination unit 103 and the settlement unit 104 ends.

The above is an example of a series of processing by the determination unit 103 and the settlement unit 104. The processing of the determination unit 103 and the settlement unit 104 is not limited to this example. For example, in step S210, it may be settled to suspend the work related to the article without including information for causing the manager to input the handling method in the notification to the manager. The operation of the robot arm when the work is suspended may be to avoid the article to be worked as described above.

The control device according to the present example embodiment described above includes an acquisition unit, a control unit, a determination unit, and a settlement unit. The acquisition unit acquires work information including information on work performed by the robot arm and information on an article to be worked. The control unit causes the robot arm to perform an operation of lifting up a predetermined unit of articles based on the work information. The determination unit determines that there is a possibility that a plurality of articles are packaged together based on the sensor data obtained when the operation is being performed. In a case where it is determined that there is a possibility that a plurality of articles are packaged together, the settlement unit settles a handling method for the article according to the sensor data.

As a result, the control device in the present example embodiment can perform appropriate handling of the packaged together article.

Whether the articles are packaged together is determined by a human, and a response to the put-together articles is also set by a human. On the other hand, the control device according to the present example embodiment determines the possibility of being packaged together based on the sensor data when the operation of lifting up a predetermined unit of articles is executed, and settles a handling method. As a result, even if it is not possible to completely grasp whether the robot arm and the control device are packaged together, it is possible to perform an executable correspondence between the robot arm and the control device, and it is possible to save labor of work on the packaged together article.

Modification

Next, a modification of the present disclosure will be described. Hereinafter, description of contents overlapping with the above description will be omitted to the extent that the description of the present example embodiment is not unclear. In the present modification, an example will be described in which information regarding the packaged together articles is registered in a DB in association with the information regarding the article.

Figure 15:
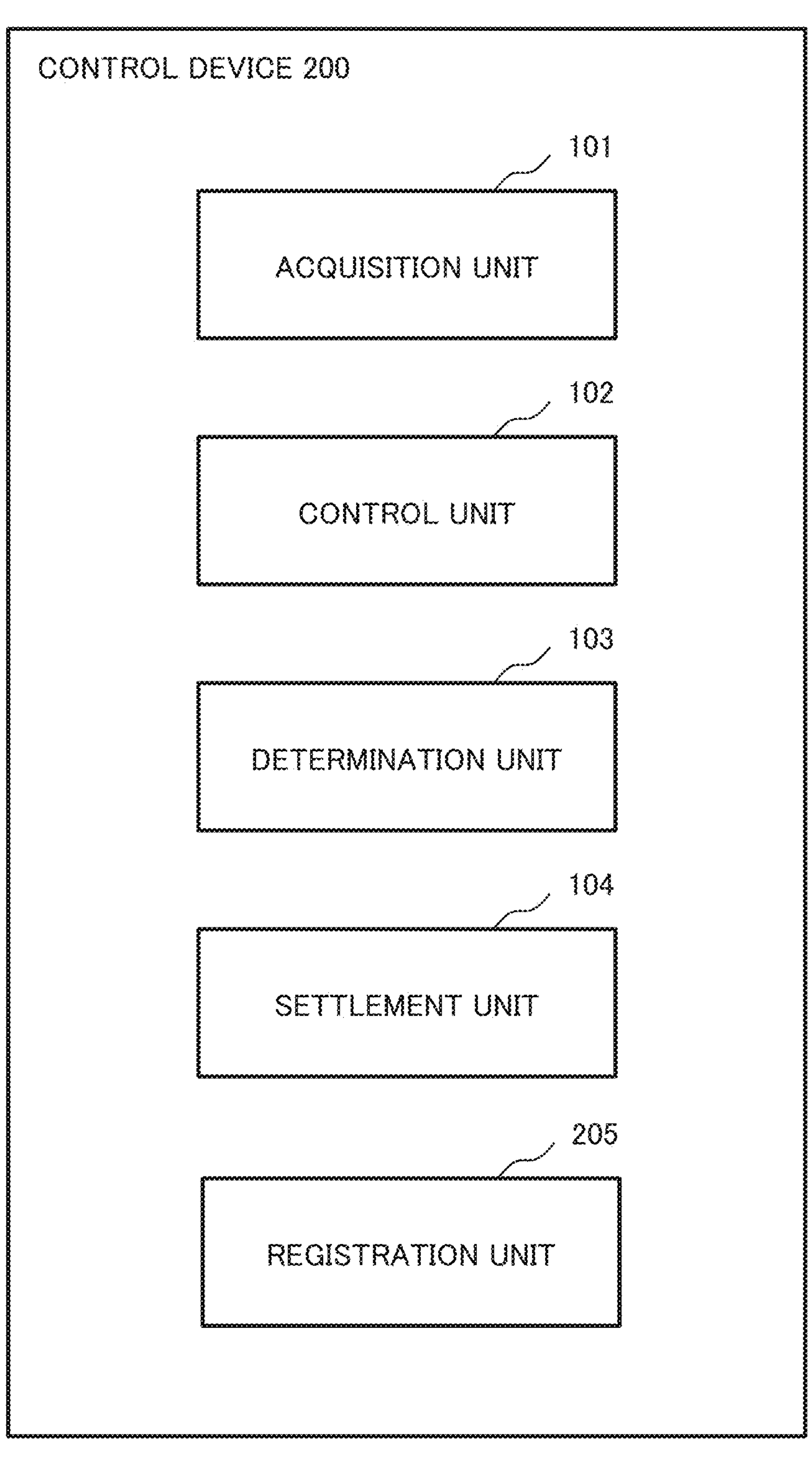
FIG. 15 is a block diagram illustrating a functional configuration of the control device.

FIG. 15 is a block diagram illustrating a functional configuration of a control device 200 according to the modification. The control device 200 includes a registration unit 205 in addition to the configuration of the control device 100 of the example embodiment.

The registration unit 205 is an example of a registration means that registers information regarding the packaged together articles in a work information database in association with work information in a case where it is determined that there is a possibility that a plurality of articles are packaged together. The registration unit 205 registers, among the work information, information regarding an article packaged together in association with the article information of the article determined to have a possibility that a plurality of articles are packaged together.

The information regarding the packaged together articles may be, for example, the number of the packaged together articles or an operation performed on the packaged together articles.

In a case where it is determined that there is a possibility that the articles are packaged together, but an operation of handling a predetermined unit of articles is performed by changing the lifting operation or removing the packaging, the registration unit 205 may estimate and register the number of articles packaged together based on the number of articles handled in the work.

Although the present disclosure has been particularly shown and described with reference to the present example embodiment, the present disclosure is not limited to the above example embodiment.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

It will be understood by those of ordinary skill in the art that various changes in form and details may be made therein without departing from the spirit and scope of the present disclosure as defined by the claims.

For example, although the plurality of operations are described in order in the form of a flowchart, the order of description does not limit the order of executing the plurality of operations. Therefore, when each example embodiment is implemented, the order of the plurality of operations may be changed within a range that does not interfere with the content.

Further, it is noted that the inventor's intent is to retain all equivalents of the claimed invention even if the claims are amended during prosecution.

SUPPLEMENTARY NOTE

Some or all of the above example embodiments may be described as the following Supplementary Notes, but are not limited to the following.

Supplementary Note 1

A control device including:

an acquisition means that acquires work information including information on work performed by a robot arm and information on an article as a target of the work;

a control means that causes the robot arm to perform an operation of lifting up a predetermined unit of articles based on the work information;

a determination means that determines that there is a possibility that a plurality of articles are packaged together based on sensor data obtained when the operation is being performed; and a settlement means that, when it is determined that there is a possibility that a plurality of articles are packaged together, settles a handling method for the article according to the sensor data.

Supplementary Note 2

The control device according to Supplementary Note 1, in which the settlement means settles, as a handling method, causing the robot arm to execute an operation as a handling method according to a number of articles packaged together based on the sensor data and a number of articles that are targets of the work included in the work information.

Supplementary Note 3

The control device according to Supplementary Note 2, in which the settlement means settles, when a number of the plurality of articles based on the sensor data is equal to or less than a number of articles that are articles of the work included in the work information, causing the robot arm to execute an operation of taking out the plurality of articles as a handling method.

Supplementary Note 4

The control device according to Supplementary Note 2 or 3, in which the settlement means settles, when a number of the plurality of articles based on the sensor data is larger than a number of articles that are targets of the work included in the work information, causing the robot arm to change an operation of taking out the predetermined units of articles according to a packaging state of a plurality of articles packaged together based on the sensor data and to execute the operation as a handling method.

Supplementary Note 5

The control device according to any one of Supplementary Notes 2 to 4, in which the settlement means settles, when a number of the plurality of articles based on the sensor data is larger than a number of articles that are targets of the work included in the work information, causing the robot arm to execute an operation of unpackaging the packaged together articles and an operation of taking out the articles, as a handling method, according to a packaging state of the plurality of packaged together articles based on the sensor data.

Supplementary Note 6

The control device according to any one of Supplementary Notes 1 to 5, in which the settlement means settles notifying a manager that there is a possibility that a plurality of articles are packaged together as a handling method.

Supplementary Note 7

The control device according to Supplementary Note 6, in which the control means causes a robot arm to execute an operation to be executed on packaged together articles acquired from the manager.

Supplementary Note 8

The control device according to any one of Supplementary Notes 1 to 7, further including:

a registration means that registers, when it is determined that there is a possibility that a plurality of articles are packaged together, information regarding articles determined to be packaged together in a work information database in association with the work information.

Supplementary Note 9

The control device according to Supplementary Note 8, in which the registration means registers, when it is determined that there is a possibility that a plurality of articles are packaged together, a number of the packaged together articles in a work information database in association with the work information based on the sensor data.

Supplementary Note 10

A control method including:

acquiring work information including information on work performed by a robot arm and information on an article as a target of the work;

causing the robot arm to perform an operation of lifting up a predetermined unit of articles based on the work information;

determining that there is a possibility that a plurality of articles are packaged together based on sensor data obtained when the operation is being performed; and when it is determined that there is a possibility that a plurality of articles are packaged together, settling a handling method for the article according to the sensor data.

Supplementary Note 11

A non-transitory computer-readable recording medium that records a program for causing a computer to execute:

acquiring work information including information on work performed by a robot arm and information on an article as a target of the work;

causing the robot arm to perform an operation of lifting up a predetermined unit of articles based on the work information;

determining that there is a possibility that a plurality of articles are packaged together based on sensor data obtained when the operation is being performed; and when it is determined that there is a possibility that a plurality of articles are packaged together, settling a handling method for the article according to the sensor data.

The invention claimed is:

1. A control device comprising:

a memory storing instructions; and one or more processors configured to execute the instructions to:

acquire work information including information on work performed by a robot arm and information on an article as a target of the work;

cause the robot arm to perform an operation of lifting up a predetermined unit of articles based on the work information;

acquire sensor data obtained while the robot arm is performing the operation of lifting up the predetermined unit of articles by a force sensor or a weight sensor included in the robot arm and an image captured by a camera;

determine that there is a possibility that a plurality of articles are packaged together based on the sensor data;

determine whether the robot arm has lifted the predetermined unit of articles based on the sensor data;

when the robot arm has lifted articles, determine whether a weight of the lifted articles is twice or more a weight of one article;

when the weight of the lifted articles is twice or more the weight of one article, estimate a number of the plurality of articles packaged together based on the sensor data;

compare the estimated number of the plurality of articles packaged together with a number of articles that are targets of the work included in the work information;

when the estimated number of the plurality of articles packaged together is larger than the number of articles that are targets of the work included in the work information:

identify, based on the image, a packaged surface covered with a packaging material or an unpackaged surface not covered with the packaging material of the plurality of articles in a packaging state, wherein the packaging material comprises a film or paper, and wherein the packaging state includes a state where an entire surface of the plurality of articles is covered with the packaging material and a state where only some surfaces of the plurality of articles are covered with the packaging material;

based on a determination that there is an unpackaged surface and the packaging state allows taking out articles from a side surface or an upper surface, determine to cause the robot arm to execute an operation of gripping or sucking the side surface of the articles to extract the articles in a lateral direction and then lift up the predetermined unit of articles;

determine whether packaging of the plurality of articles can be removed by the robot arm based on sensor data obtained when an operation of removing the packaging is performed followed by an operation of lifting the predetermined unit of articles; and based on a determination that the packaging can be removed, determine to cause the robot arm to execute an operation of removing the packaging by cutting a part of the packaging or by gripping and pulling a part of the packaging, and then execute an operation of taking out the predetermined unit of articles; and cause the robot arm to perform a determined handling method for the article.

2. The control device according to claim 1, wherein the one or more processors are further configured to execute the instructions to:

cause the robot arm to execute an operation as a handling method according to a number of articles packaged together based on the sensor data and a number of articles that are targets of the work included in the work information.

3. The control device according to claim 2, wherein the one or more processors are further configured to execute the instructions to:

when a number of the plurality of articles packaged together based on the sensor data is equal to or less than a number of articles that are articles of the work included in the work information, cause the robot arm to execute an operation of taking out the plurality of articles as the handling method.

4. The control device according to claim 1, wherein the one or more processors are further configured to execute the instructions to:

notify a manager that there is the possibility that the plurality of articles are packaged together as the handling method.

5. The control device according to claim 4, wherein the one or more processors are further configured to execute the instructions to:

cause a robot arm to execute an operation to be executed on packaged together articles acquired from the manager.

6. The control device according to claim 1, wherein the one or more processors are further configured to execute the instructions to:

when it is determined that there is the possibility that the plurality of articles are packaged together, register information regarding articles determined to be packaged together in a work information database in association with the work information.

7. The control device according to claim 6, wherein the one or more processors are further configured to execute the instructions to:

when it is determined that there is the possibility that the plurality of articles are packaged together, register a number of the packaged together articles in a work information database in association with the work information based on the sensor data.

8. A control method by a computer, the control method comprising:

acquiring work information including information on work performed by a robot arm and information on an article as a target of the work;

causing the robot arm to perform an operation of lifting up a predetermined unit of articles based on the work information;

acquiring sensor data obtained while the robot arm is performing the operation of lifting up the predetermined unit of articles by a force sensor or a weight sensor included in the robot arm and an image captured by a camera;

determining that there is a possibility that a plurality of articles are packaged together based on the sensor data;

determining whether the robot arm has lifted the predetermined unit of articles based on the sensor data;

when the robot arm has lifted articles, determining whether a weight of the lifted articles is twice or more a weight of one article;

when the weight of the lifted articles is twice or more the weight of one article, estimating a number of the plurality of articles packaged together based on the sensor data;

comparing the estimated number of the plurality of articles packaged together with a number of articles that are targets of the work included in the work information;

when the estimated number of the plurality of articles packaged together is larger than the number of articles that are targets of the work included in the work information:

identifying, based on the image, a packaged surface covered with a packaging material or an unpackaged surface not covered with the packaging material of the plurality of articles in a packaging state, wherein the packaging material comprises a film or paper, and wherein the packaging state includes a state where an entire surface of the plurality of articles is covered with the packaging material and a state where only some surfaces of the plurality of articles are covered with the packaging material;

based on a determination that there is an unpackaged surface and the packaging state allows taking out articles from a side surface or an upper surface, determining to cause the robot arm to execute an operation of gripping or sucking the side surface of the articles to extract the articles in a lateral direction and then lift up the predetermined unit of articles;

determining whether packaging of the plurality of articles can be removed by the robot arm based on sensor data obtained when an operation of removing the packaging is performed followed by an operation of lifting the predetermined unit of articles; and based on a determination that the packaging can be removed, determining to cause the robot arm to execute an operation of removing the packaging by cutting a part of the packaging or by gripping and pulling a part of the packaging, and then execute an operation of taking out the predetermined unit of articles; and causing the robot arm to perform a determined handling method for the article.

9. A non-transitory computer-readable recording medium that records a program for causing a computer to execute:

acquiring work information including information on work performed by a robot arm and information on an article as a target of the work;

causing the robot arm to perform an operation of lifting up a predetermined unit of articles based on the work information;

acquiring sensor data obtained while the robot arm is performing the operation of lifting up the predetermined unit of articles by a force sensor or a weight sensor included in the robot arm and an image captured by a camera;

determining that there is a possibility that a plurality of articles are packaged together based on the sensor data;

determining whether the robot arm has lifted the predetermined unit of articles based on the sensor data;

when the robot arm has lifted articles, determining whether a weight of the lifted articles is twice or more a weight of one article;

when the weight of the lifted articles is twice or more the weight of one article, estimating a number of the plurality of articles packaged together based on the sensor data;

comparing the estimated number of the plurality of articles packaged together with a number of articles that are targets of the work included in the work information;

when the estimated number of the plurality of articles packaged together is larger than the number of articles that are targets of the work included in the work information:

identifying, based on the image, a packaged surface covered with a packaging material or an unpackaged surface not covered with the packaging material of the plurality of articles in a packaging state, wherein the packaging material comprises a film or paper, and wherein the packaging state includes a state where an entire surface of the plurality of articles is covered with the packaging material and a state where only some surfaces of the plurality of articles are covered with the packaging material;

based on a determination that there is an unpackaged surface and the packaging state allows taking out articles from a side surface or an upper surface, determining to cause the robot arm to execute an operation of gripping or sucking the side surface of the articles to extract the articles in a lateral direction and then lift up the predetermined unit of articles;

determining whether packaging of the plurality of articles can be removed by the robot arm based on sensor data obtained when an operation of removing the packaging is performed followed by an operation of lifting the predetermined unit of articles;

based on a determination that the packaging can be removed, determining to cause the robot arm to execute an operation of removing the packaging by cutting a part of the packaging or by gripping and pulling a part of the packaging, and then execute an operation of taking out the predetermined unit of articles; and causing the robot arm to perform a determined handling method for the article.

* * * * *